United States Patent
Calabrese et al.

(10) Patent No.: US 6,343,215 B1
(45) Date of Patent: Jan. 29, 2002

(54) ANSI 41 DIALED NUMBER VALIDATION

(75) Inventors: Robert Thomas Calabrese, Naperville; Thomas Edward Hudepohl, Geneva; Todd Cartwright Morgan, Oak Park, all of IL (US)

(73) Assignee: Lucent Technologies, INC, Holmde, NJ (US)

(*) Notice: Subject to any disclaimer, the term of this patent is extended or adjusted under 35 U.S.C. 154(b) by 0 days.

(21) Appl. No.: 09/189,821

(22) Filed: Nov. 10, 1998

(51) Int. Cl.⁷ .................................................. H04Q 7/20
(52) U.S. Cl. ........................ 455/432; 455/461; 455/433; 455/560; 455/565
(58) Field of Search ................................. 455/433, 411, 455/461, 565, 432, 560, 414; 379/200

(56) References Cited

U.S. PATENT DOCUMENTS

| | | | | |
|---|---|---|---|---|
| 5,898,917 A | * | 4/1999 | Batni et al. .................... | 455/564 |
| 5,920,820 A | * | 7/1999 | Qureshi et al. ................ | 455/461 |
| 5,960,363 A | * | 9/1999 | Mizikovsky et al. .......... | 455/552 |
| 6,009,322 A | * | 12/1999 | Dumont ......................... | 455/411 |
| 6,026,291 A | * | 2/2000 | Carlsson et al. ............... | 455/406 |
| 6,078,805 A | * | 6/2000 | Scott ............................. | 455/406 |
| 6,081,731 A | * | 6/2000 | Boltz et al. .................... | 455/565 |
| 6,131,028 A | * | 10/2000 | Whitington .................... | 455/435 |
| 6,141,549 A | * | 10/2000 | Nguyen ......................... | 455/433 |
| 6,198,945 B1 | * | 3/2001 | Chen et al. .................... | 455/560 |
| 6,236,857 B1 | * | 5/2001 | Calabrese et al. ............. | 455/426 |

* cited by examiner

Primary Examiner—Nay Maung
Assistant Examiner—Temica M. Davis
(74) Attorney, Agent, or Firm—James Weigand

(57) ABSTRACT

A cellular system in accordance with the principles of the present invention permits one node, or network element, within a cellular system to request dialed number validation from another network element in the cellular system. The invoking and responding nodes may be any of the following: a mobile switching center, a home location register, a service control point, or a service node. Upon reaching a state in call processing where further dialed number analysis may be required, the invoking node will send an ANSI-41 compliant dialed number validation request message to the node performing validation. The validating node will determine whether the dialed number is allowed under the subscriber's dialing plan. After making the determination, the validating node will return a message to the invoking node indicating whether the specified digits are allowed according to the subscriber's dialing plan.

24 Claims, 3 Drawing Sheets

|        | INVOKING FE | RESPONDING FE |
|--------|-------------|---------------|
| CASE 1 | SERVING MSC | HOME MSC      |
| CASE 2 | SERVING MSC | HLR           |
| CASE 3 | HLR         | HOME MSC      |
| CASE 4 | HLR         | SCP OR SN     |
| CASE 5 | HOME MSC    | SCP OR SN     |
| CASE 6 | SCP OR SN   | HOME MSC      |
| CASE 7 | SERVING MSC | SCP OR SN     |

FIG. 3

| | | TYPE | REFERENCE | NOTES |
|---|---|---|---|---|
| 124 | DN VALIDATION REQUEST INVOKE | | | A |
| 126 | MOBILE IDENTIFICATION NUMBER | M | 6.5.2.81 | B |
| 128 | DIGITS | M | 6.5.2.58 | C |
| 129 | SERVING CELL ID | O | 6.5.2.117 | |
| 130 | DN VALIDATION REQUEST RETURN RESULT | | | C |
| 132 | FEATURE RESULT | M | 6.5.2.67 | |

M = MANDATORY
O = OPTIONAL

FIG. 4

ANSI 41 DIALED NUMBER VALIDATION

FIELD OF THE INVENTION

The invention relates to dialed number validation and, more particularly, to the validation of dialing plans within a system that complies with the ANSI 41, revision C, standard for cellular radiotelecommunications intersystem operations.

BACKGROUND OF THE INVENTION

Mobile cellular radiotelecommunications systems (cellular systems hereinafter) have evolved to permit the continuous operation of a cellular telephone as the telephone's subscriber roams from cell to cell and across system boundaries. Mobile communications in the telephony industry generally comply with a standard adopted and recognized by the American National Standards Institute (ANSI), referred to as ANSI 41. The ANSI 41 standard is published by the Telecommunications Industry Association/Electronics Industry Association (TIA/EIA) TR-45.2 subcommittee, and is hereby incorporated by reference. Although ANSI 41 has evolved to incorporate additional features over the years, an essential aspect of any cellular system, dialed number validation, has not been directly addressed by the standard. Dialed number validation is the process of determining whether a dialed number is allowable for a particular subscriber. Dialed number validation typically includes such steps as determining that a set of dialed digits contains the correct number of digits and that the serving switch can translate the digits and route the call. Validation could also include per subscriber information such as a list of digit strings that a subscriber may be allowed to use or geographic-based and time-based restrictions.

In today's cellular networks, dialed number validation is typically performed at the serving mobile switching center. Hence, each mobile switching center must contain the necessary data to perform this function for each subscriber that it serves. (Because metropolitan areas are covered by multiple mobile switching centers and because many networks extend nationwide, there is extensive duplication of this data throughout the network.) In addition, a subscriber's home location register typically contains some dialing plan-related functionality such as classes of service and allowable features. These capabilities are passed to the visited location register during normal ANSI 41 processing such as profile transfer. The serving mobile switching center then uses the combination of its translations and the visited location register to process call originations. In addition, the serving mobile switching center may use Wireless Intelligent Network (WIN) capabilities to request further translation of dialed digits from other network nodes.

However, there are various call scenarios in which dialed number validation is required and it is either not possible to perform the function at the serving node or it would require extensive duplication of translation information. There is no operation defined in ANSI 41 for dialed number validation. This invention provides a means of doing so.

As an example, if a subscriber travels from his home mobile cellular system in Boston to a different system in New York, and the subscriber wants to update his call forward-to number, the subscriber must enter a specific sequence of digits to invoke this feature. His home systems in Boston and his visited system in New York may use different digit sequences to invoke this feature. Nevertheless, it is highly desirable that all the features the subscriber pays for in his home system are available to him in all systems in which he might travel. One approach to providing this "seamless" transfer of service would involve duplicating all the subscriber's cellular system information, including his dialing plan information, at each mobile switching center the subscriber visits. However, this approach is impractical because duplicating this information for every subscriber at every mobile switching center would impose a significant burden on the storage, processing, and maintenance requirements of mobile cellular systems.

Rather than copying complete subscriber information for each subscriber to each system network element, conventional systems typically use the ANSI 41 Feature Request capability to get validation of the request and update the data at the home location register; specifically, "is the mobile allowed to use the call forwarding feature?" and "is the forward-to number valid?" However, since ANSI 41 does not define a procedure for inter-system dialed number validation, this requires the home location register to have a copy of the mobile's dialed number translations.

In addition to such feature scenarios, other cases where inter-system dialed number validation could be used include node-based services where calls are originated on behalf of a mobile subscriber such as voice-based dialing applications or callback capabilities on voicemail systems. In these situations, a mobile originated call is routed to an adjunct system which queries the mobile for dialed digits and subsequently routes the call out to the network. Instead of duplicating the dialed number translations which reside on the mobile switching centers, the adjunct could invoke a dialed number validation request prior to routing.

Another potential application of dialed number validation capability is in the centralization of dialing plan functionality. Although the processing and signaling overhead of per-call inter-system validation would be potentially onerous today (and could be accomplished in part using WIN capabilities), it is envisioned that all or part of dialing plans could be centralized and accessed at various points, or from various network elements, during the processing of a mobile call (currently not supported by WIN).

A system and method that conform to the ANSI 41 standard and that provide dialed number validation between nodes in a cellular system would therefore be particularly desirable.

SUMMARY

A cellular system in accordance with the principles of the present invention permits one node, or a network element, within a cellular network to request validation information from a network element in another cellular system.

In an illustrative embodiment, when a subscriber keys in digits in his mobile cellular unit that invoke the call forwarding feature with a forward-to number, the serving mobile switching center sends a feature request message to the subscriber's home location register. The home location register determines that the mobile user has access to the feature and then sends an ANSI 41-compliant dialed number validation request message to the subscriber's home mobile switching center in order to determine whether the dialed digits keyed in by the subscriber are allowed under the subscriber's dialing plan. After making the determination, the home mobile switching center returns a message to the home location register that indicates whether the digits keyed in by the subscriber are allowed according to his dialing plan. The home location register then updates the forward-to number for the subscriber and returns a feature request return result to the serving mobile switching center, indicating whether the feature request was successfully processed.

Various network elements, including visited mobile switching centers, home mobile switching centers, home location registers, service control points, and service nodes may initiate and complete the new dialed number validation request.

BRIEF DESCRIPTION OF THE DRAWINGS

The above and further features, aspects, and advantages of the invention will be apparent to those skilled in the art from the following detailed description, taken together with the accompanying drawings in which:

FIG. 3 is a table listing some of the invoke/respond combinations of network elements for dialed number validation according to the principles of the present invention; and FIG. 4 is a table listing of the format of the new dialed number validation request and return results.

DETAILED DESCRIPTION

A cellular system in accordance with the principles of the present invention provides dialed number validation without duplicating the subscriber's dialing plan information completely at numerous nodes in the network. The new dialed number validation process is carried out in conformance with the ANSI 41 standard. A node, or functional element, within a cellular system in accordance with the principles of the present invention may validate a subscriber's dialed digits by sending a validation request to and receiving a validation response from another node within the network. Both the validation request and validation response conform to the ANSI 41 standard for cellular radiotelecommunications intersystem operations. Such dialed number validation may be employed, for example, to update a call-forward-to number and may include the steps of verifying that the invoking subscriber pays for the feature and that the updated forward-to number is permissible in some sense. This permissibility may be based, for example, on whether the number is within the same area code as the serving mobile switching center.

Figure 1:
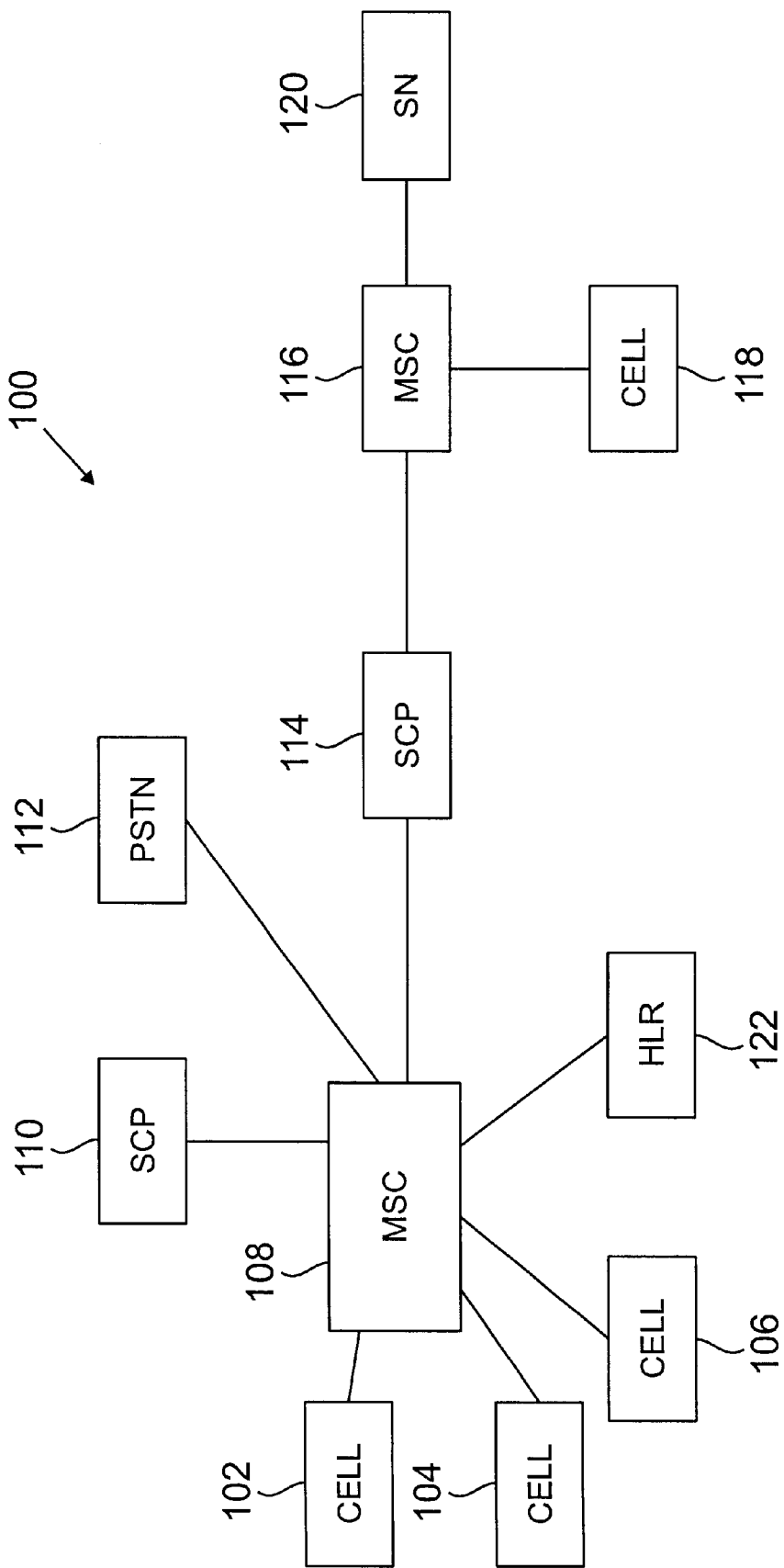
FIG. 1 is a conceptual block diagram of a cellular system in accordance with the principles of the present invention.

A cellular system 100 in accordance with the principles of the present invention is illustrated in the conceptual block diagram of FIG. 1, in which a plurality of cellular units 102, 104, 106, which, for example, may take the form of cellular telephone handsets, are served by a mobile switching center 108. The mobile switching center is typically in communication with one or more service control points (110 and 108) which contain applications supporting enhanced services. The mobile switching center 108 is also connected to the publicly switched telephone network 112. A cellular unit 118 communicates with the mobile switching center 116. A service node 120 communicates with the mobile switching center 116. A home location register 122, which includes a database related to a group of subscribers, each of which is identified by a mobile identification number associated with the mobile cellular unit, communicates with the mobile switching center 108. The service control point 114 and service node 120 are functional elements as set forth in TIA/EIA 664, PN-3661, the disclosure of which is hereby incorporated by reference.

Each cellular unit has associated with it a mobile identification number and the mobile switching centers include a table, or similar form of file, that maps the mobile identification number to the subscriber's home location register. A call directed to the cellular unit 118 would be routed through its home mobile switching center 108. That is, the PSTN typically routes all terminating calls to a cellular unit through its home mobile switch.

In accordance with the principles of the present invention, should a subscriber using cellular unit 118 dial a series of digits that invoke special features such as turning call waiting on or off, updating a call-forward-to number, last number dialed, or other feature, the serving mobile switching center 116 contacts, in the normal course of operation, the subscriber's home location register 122. However, because a conventional home location register 122 does no more than rudimentary digit analysis, if the subscriber dials a series of digits that invoke a special feature, the home location register 122 cannot validate the subscriber's dialing plan.

Figure 2:
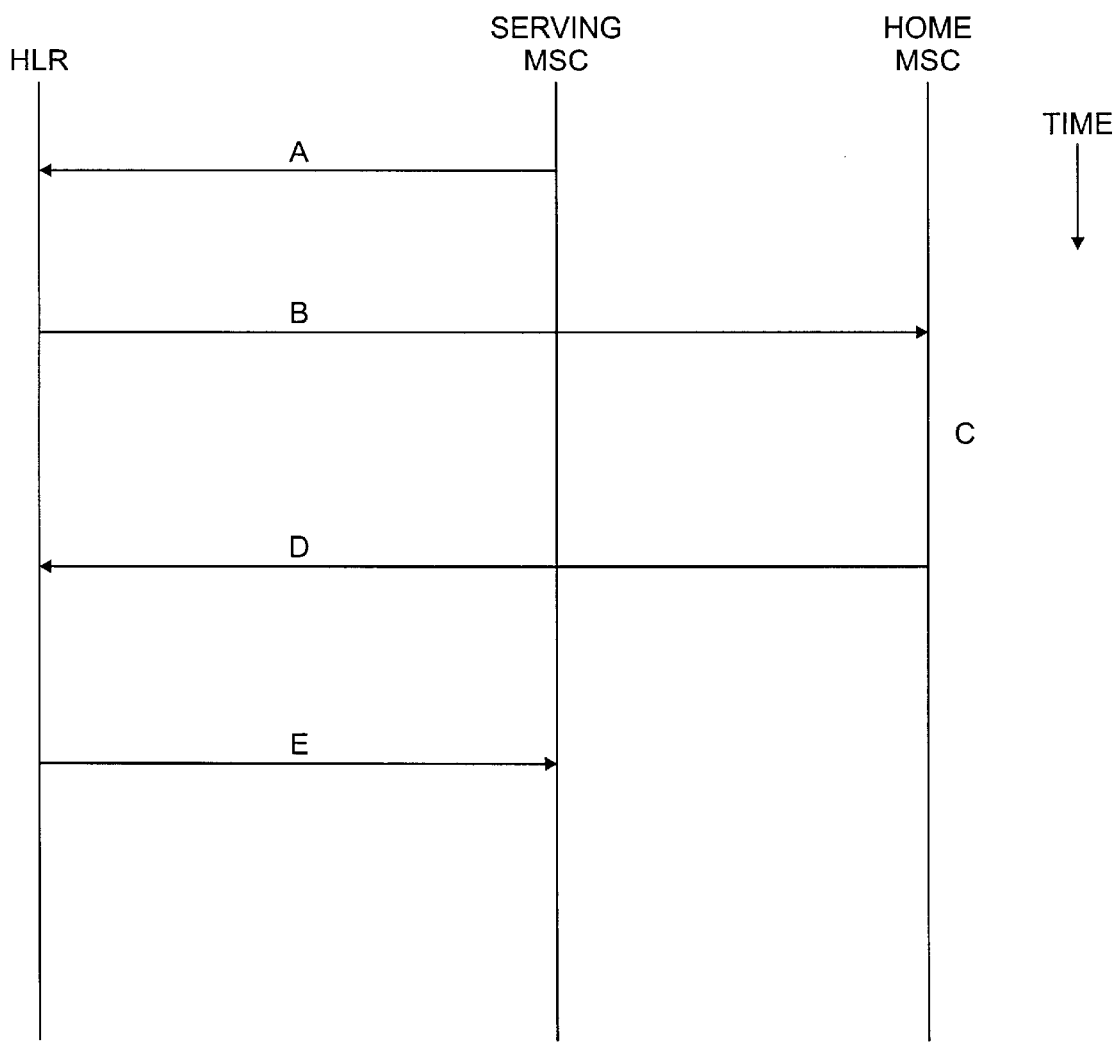
FIG. 2 is a scenario diagram depicting a dialed number validation in accordance with the principles of the present invention.

The scenario diagram of FIG. 2 illustrates the validation of a dialed number within a cellular system in accordance with the principles of the present invention. Scenario diagrams are known and set forth, for example, within the aforementioned TIA/EIA-41 publication, which has been incorporated by reference. In operation, after receiving a string of dialed digits that invoke a special feature from a cellular unit such as unit 118 of FIG. 1, a serving mobile switching center 116 sends a feature request message to the cellular unit's home location register 122 in step A. The home location register 122 determines that the dialed digits require a dialed number validation. As a result, in step B the home location register 122 formats and sends a new dialed number validation request message in accordance with the present invention to the home mobile switching center 108 of the cellular unit 118. The dialed number validation request message includes the cellular unit's mobile identification number, the digits dialed, and optionally the serving cell identification. The mobile identification number and dialed digits conform, respectively to ANSI 41 revision C reference numbers 6.5.2.81, 6.5.2.117 and 6.5.2.58, the disclosures of which are hereby incorporated by reference.

Upon receiving the dialed number validation request, the home mobile switching center 108 traverses the dialing plan for the cellular unit 118 in step C in order to determine whether the dialing plan of the subscriber associated with cellular unit 118 supports the dialed digit string in question. That is, the home mobile switching center 108 searches a tree structure, or similar data structure, that defines the subscriber's dialing plan. In step D the home mobile switching center 108 formats and sends a dialed number validation request return result to the home location register. This message indicates whether the dialed digits are allowed for the cellular unit 118. The return result conforms to the "FeatureResult" of ANSI 41 revision C reference number 6.5.2.67, the disclosure of which is hereby incorporated by reference. In step E, the home location register 122 sends a feature request return result to the serving mobile switching center 116, indicating whether the feature request was successfully processed.

Although, in the preceding example a home location register 122 is the functional element that invokes the dialed number validation request and a serving mobile switching center 116 is the functional element that responds with a dialed number validation request return result, various functional elements may invoke the new dialed number validation requests and various functional elements may respond. For example, a serving mobile switching center may invoke, with either a home mobile switching center or a home location register responding. Similarly, a home location register may invoke, with a home mobile switching center, a service control point, or service node responding. A home mobile switching center may invoke, with either a service control point or service node responding. A service control point or service node may invoke with a home mobile switching center responding. Other combinations of invoking and responding functional elements are possible. For example, a serving mobile switching center may invoke, with either a home mobile switching center, an home location register, an SCP, or an SN responding. Several of the invoking and responding combinations are listed in FIG. 3.

In accordance with the principles of the present invention, the invocation of a dialed number validation request and the dialed number request return result follow the formats set forth in FIG. 4. The dialed number validation request invocation 124 includes, as noted above, the mobile identification number 126 of the cellular unit invoking the feature call and the dialed digits 128 that are to be analyzed: both are mandatory. The request may also include a serving cell identification 129. The dialing plan request return result 130 includes a feature result 132, which also is mandatory.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. Apparatus for dialed number validation in an ANSI 41 cellular radio telecommunications system comprising:

a first network element responsive to an ANSI 41 feature request from a second network element by sending a dialed number validation request to a third network element, the third network element responsive to the dialed number validation request by validating the dialed number and sending a dialed number validation return result to the first network element, the first network element responsive to a reception of the dialed number validation return result by sending an ANSI 41 feature request return result reflective of the dialed number return result to the second network element.

2. The apparatus of claim 1 wherein the dialed number validation request includes a mobile identification number in accordance with TIA/EIA 6.5.2.81.

3. The apparatus of claim 2 wherein the dialed number validation request includes dialed digits in accordance with TIA/EIA 6.5.2.58.

4. The apparatus of claim 1 wherein the feature request return result conforms to TIA/EIA 6.5.2.67.

5. The apparatus of claim 1 wherein the third network element processes the dialed number validation request by searching a dialing plan for a subscriber related to a mobile cellular unit from which the digits were dialed.

6. The apparatus of claim 1 wherein the first network element is a serving mobile switching center for a cellular unit.

7. The apparatus of claim 6 wherein the third network element is a home mobile switching center for the cellular unit.

8. The apparatus of claim 6 wherein the third network element is a home location register for the cellular unit.

9. The apparatus of claim 6 wherein the third network element is a service control point.

10. The apparatus of claim 6 wherein the third network element is a service node.

11. The apparatus of claim 1 wherein the first network element is a home location register for a cellular unit.

12. The apparatus of claim 9 wherein the third network element is a home mobile switching center for the cellular unit.

13. The apparatus of claim 9 wherein the third network element is a service control point within the network.

14. The apparatus of claim 9 wherein the third network element is a service node within the network.

15. The apparatus of claim 1 wherein the first network element is a home mobile switching center for a cellular unit.

16. The apparatus of claim 13 wherein the third network element is a service control point within the network.

17. The apparatus of claim 13 wherein the third network element is a service node within the network.

18. The apparatus of claim 1 wherein the first network element is a service control point and the third network element is a home mobile switching center for a cellular unit.

19. The apparatus of claim 1 wherein the first network element is a service node within the network and the third network element is a home mobile switching center for a cellular unit.

20. A method for validating a dialed number in a network defined by the ANSI 41 cellular radio telecommunications inter-systems operations standard comprising the steps of:

(a) a first network element responding to an ANSI 41 feature request from a second network element by sending a dialed number validation request to a third network element, (b) the third network element responding to the dialed number validation request by validating the dialed number and sending a dialed number validation return result to the first network element, and (c) the first network element responding to a reception of the dialed number validation return result by sending an ANSI 41 feature request return result reflective of the dialed number return result to the second network element.

21. The method of claim 20 wherein step (a) comprises sending a mobile identification number in accordance with TIA/EIA 6.5.2.81.

22. The method of claim 20 wherein step (a) includes sending dialed digits according to TIA/EIA 6.5.2.58.

23. The method of claim 20 wherein step (c) comprises the step of sending a feature result in accordance with TIA/EIA 6.5.2.67.

24. The method of claim 20 wherein step (a) comprises sending a serving cell identification in accordance with TIA/EIA 6.5.2.117.

* * * * *